US008847612B2

(12) United States Patent
Jonsson

(10) Patent No.: US 8,847,612 B2
(45) Date of Patent: Sep. 30, 2014

(54) INTEGRATED TEST SYSTEM FOR A TOUCH SENSOR

(75) Inventor: Carl Olof Fredrik Jonsson, Gavle (SE)

(73) Assignee: Atmel Corporation, San Jose, CA (US)

(*) Notice: Subject to any disclaimer, the term of this patent is extended or adjusted under 35 U.S.C. 154(b) by 468 days.

(21) Appl. No.: 13/227,599

(22) Filed: Sep. 8, 2011

(65) Prior Publication Data
US 2013/0063167 A1 Mar. 14, 2013

(51) Int. Cl.
G01R 27/26 (2006.01)
G06F 3/044 (2006.01)
G06F 3/041 (2006.01)

(52) U.S. Cl.
CPC .............. G06F 3/044 (2013.01); G06F 3/0418 (2013.01)
USPC ........................................................ 324/686

(58) Field of Classification Search
CPC ..................... G01R 31/3187; G01R 31/31915; G01R 27/2605
USPC ............................ 324/658, 686; 345/173, 174
See application file for complete search history.

(56) References Cited

U.S. PATENT DOCUMENTS

| 6,717,430 | B2 * | 4/2004 | Burch ....................... 324/750.18 |
| 7,236,113 | B1 * | 6/2007 | Wang ............................. 341/143 |
| 7,663,607 | B2 | 2/2010 | Hotelling |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 8,432,170 | B1 * | 4/2013 | Walsh et al. .................. 324/658 |
| 2004/0128110 | A1 * | 7/2004 | Schulte et al. ................ 702/188 |
| 2004/0183787 | A1 * | 9/2004 | Geaghan et al. .............. 345/173 |
| 2006/0202969 | A1 * | 9/2006 | Hauck ............................ 345/173 |
| 2007/0200831 | A1 * | 8/2007 | Wang ............................. 345/173 |
| 2008/0278453 | A1 * | 11/2008 | Reynolds et al. ............. 345/173 |
| 2009/0315854 | A1 | 12/2009 | Matsuo |

(Continued)

FOREIGN PATENT DOCUMENTS

WO WO 2012/129247 9/2012

OTHER PUBLICATIONS

Die, available at http://en.wikipedia.org/wiki/Die_(integrated_circuit) on Mar. 4, 2010.*
U.S. Appl. No. 61/454,936, filed Mar. 21, 2011, Myers.

(Continued)

Primary Examiner — Melissa Koval
Assistant Examiner — Daniel Miller
(74) Attorney, Agent, or Firm — Baker Botts LLP

(57) ABSTRACT

In one embodiment, a method includes restricting current flow between a node of a touch sensor and each of a drive system of the touch sensor, a sense system of the touch sensor, and a test system of the touch sensor. The method further includes capacitively coupling the drive system to the sense system through the test system. The method further includes using at least the drive system and the test system, inducing a charge on the sense system. The method further includes measuring the induced charge on the sense system. The method further includes making a pass or fail determination for at least a portion of the touch sensor based at least in part on the measured induced charge.

19 Claims, 2 Drawing Sheets

(56) References Cited

U.S. PATENT DOCUMENTS

| | | |
|---|---|---|
| 2012/0098557 A1* | 4/2012 | Krauss et al. .............. 324/750.3 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

INTEGRATED TEST SYSTEM FOR A TOUCH SENSOR

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid, for example, on a display screen. In a touch-sensitive-display application, the touch sensor may enable a user to interact directly with what is displayed on the screen, rather than indirectly with a mouse or touchpad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are different types of touch sensors, such as (for example) resistive touch screens, surface acoustic wave touch screens, and capacitive touch screens. Herein, reference to a touch sensor may encompass a touch screen, and vice versa, where appropriate. A capacitive touch screen may include an insulator coated with a substantially transparent conductor in a particular pattern. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
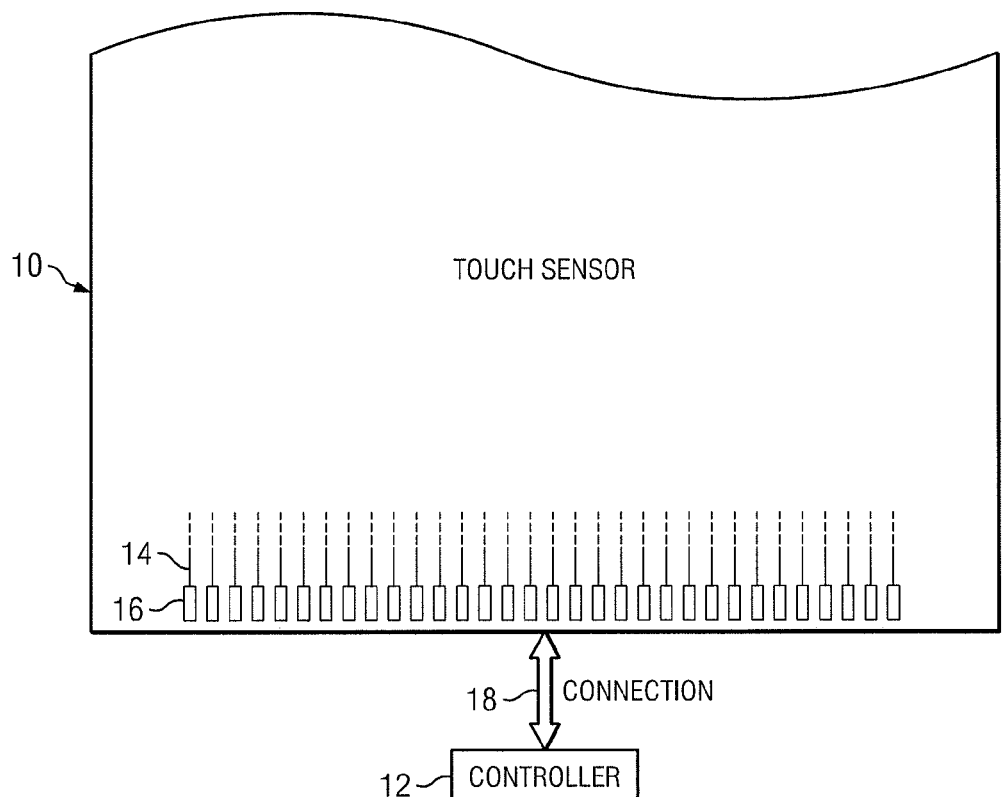
FIG. 1 illustrates an example device with a touch-sensitive area.

FIG. 1 illustrates an example touch sensor 10 with an example controller 12. Herein, reference to a touch sensor may encompass a touch screen, and vice versa, where appropriate. Touch sensor 10 and controller 12 may detect the presence and location of a touch or the proximity of an object within a touch-sensitive area of touch sensor 10. In addition, as explained further below, for each detected presence and location of a touch or the proximity of an object within a touch-sensitive area of touch sensor 10, certain embodiments disclosed herein may be configured to identify that touch object.

Herein, reference to a touch sensor may encompass both the touch sensor and its controller, where appropriate. Similarly, reference to a controller may encompass both the controller and its touch sensor, where appropriate. Touch sensor 10 may include one or more touch-sensitive areas, where appropriate. Touch sensor 10 may include an array of drive and sense electrodes (or an array of electrodes of a single type (e.g. drive)) disposed on a substrate, which may be a dielectric material.

An electrode (whether a drive electrode or a sense electrode) may be an area of conductive material forming a shape, such as for example a disc, square, rectangle, other suitable shape, or suitable combination of these. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy approximately 50% of the area of its shape. As an example and not by way of limitation, an electrode may be made of ITO and the ITO of the electrode may occupy approximately 50% of the area of its shape in a hatched, mesh, or other suitable pattern. In particular embodiments, the conductive material of an electrode may occupy approximately 5% of the area of its shape. As an example and not by way of limitation, an electrode may be made of fine lines of metal or other conductive material (such as for example copper, silver, or a copper- or silver-based material) and the fine lines of conductive material may occupy approximately 5% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes or the means of electrically isolating or physically separating the shapes from each other) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). The second layer of OCA may be disposed between the substrate with the conductive material making up the drive or sense electrodes and the dielectric layer, and the dielectric layer may be disposed between the second layer of OCA and an air gap to a display of a device including touch sensor 10 and controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm (including the conductive material forming the drive or sense electrodes); the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and controller 12 may measure the change in capacitance. By measuring changes in capacitance throughout the array, controller 12 may determine the position of the touch or proximity within the touch-sensitive area(s) of touch sensor 10.

In a self-capacitance implementation, touch sensor 10 may include an array of electrodes of a single type (e.g. sense) that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have a single-layer configuration, with drive and sense electrodes disposed in a pattern on one side of a substrate. In such a configuration, a pair of drive and sense electrodes capacitively coupled to each other across a space between them may form a capacitive node. In a single-layer configuration for a self-capacitance implementation, electrodes of only a single type (e.g. sense) may be disposed in a pattern on one side of the substrate. As an alternative to a single-layer configuration, touch sensor 10 may have a two-layer configuration, with drive electrodes disposed in a pattern on one side of a substrate and sense electrodes disposed in a pattern on another side of the substrate. In such a configuration, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across the substrate at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 may detect and process the change in capacitance to determine the presence and location of the touch or proximity input. Controller 12 may then communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

Controller 12 may be one or more integrated circuits (ICs)—such as for example general-purpose microprocessors, microcontrollers, programmable logic devices or arrays, application-specific ICs (ASICs)—on a flexible printed circuit (FPC) bonded to the substrate of touch sensor 10, as described below. Controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within one or more touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 may couple the drive or sense electrodes of touch sensor 10 to bond pads 16, also disposed on the substrate of touch sensor 10. As described below, bond pads 16 facilitate coupling of tracks 14 to controller 12. Tracks 14 may extend into or around (e.g. at the edges of) the touch-sensitive area(s) of touch sensor 10. Particular tracks 14 may provide drive connections for coupling controller 12 to drive electrodes of touch sensor 10, through which the drive unit of controller 12 may supply drive signals to the drive electrodes. Other tracks 14 may provide sense connections for coupling controller 12 to sense electrodes of touch sensor 10, through which the sense unit of controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector at an edge of the substrate of touch sensor 10 (similar to tracks 14).

Bond pads 16 may be located along one or more edges of the substrate, outside the touch-sensitive area(s) of touch sensor 10. As described above, controller 12 may be on an FPC. Bond pads 16 may be made of the same material as tracks 14 and may be bonded to the FPC using an anisotropic conductive film (ACF). Connection 18 may include conductive lines on the FPC coupling controller 12 to bond pads 16, in turn coupling controller 12 to tracks 14 and to the drive or sense electrodes of touch sensor 10. This disclosure contemplates any suitable connection 18 between controller 12 and touch sensor 10.

Figure 2:
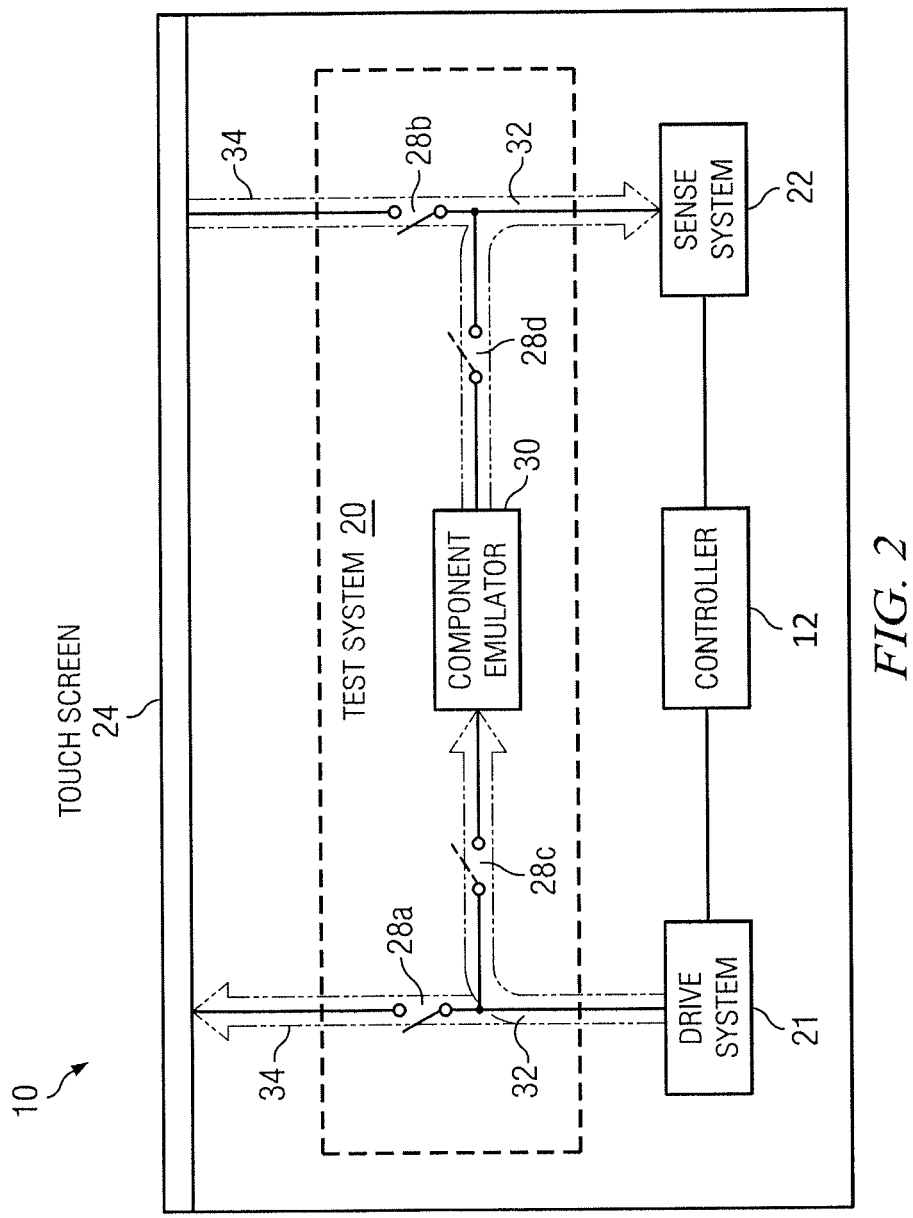
FIG. 2 illustrates an example schematic representation of a test system that may be integrated within, and used by, certain embodiments of the example device of FIG. 1.

FIG. 2 illustrates an example schematic representation of a test system 20 that may be integrated within, and used by, certain embodiments of the touch sensor 10 of FIG. 1. In this example, touch sensor 10 includes a test system 20, a sense system 21, a drive system 22, a touch screen 24, and a controller 12. Test system 20 generally includes a system of switches 28 (e.g. switches 28a and 28) and a component emulator 30. As explained further below, test system 20 may be used to test certain functionality of touch sensor 10.

In certain embodiments, drive system 21 and sense system 22 operate in cooperation with each other to sense changes in an electrical characteristic for the purpose of touch sensing. In a capacitive form of touch sensing, for example, drive system 21 and sense system 22 may be capable of sensing a change in capacitance at one or more nodes capacitively coupling an electrode of drive system 21 to an electrode of sense system 22. Drive system 21 and sense system 22 may each include respective arrays of electrodes. In a particular embodiment, for example, drive system 21 includes an array of the drive electrodes described previously with reference to FIG. 1; and sense system 22 includes an array of the sense electrodes described previously with reference to FIG. 1; however, drive system 21 and sense system 22 may include any suitable type of electrode(s).

In certain embodiments, an electrode of drive system 21 may be capable of using each of two mutually parallel conductive paths 32 and 34 to induce a charge in an electrode of sense system 22. As shown in FIG. 2, for example, one of the conductive paths 32 may include at least a portion of component emulator 30; and another one of the conductive paths 34 may include at least a portion of touch screen 24.

In various embodiments, touch screen 24 refers to a touch-sensitive area of touch sensor 10. In a touch-sensitive-display application, for example, touch screen 24 may enable a user to interact directly with what is displayed on the screen (e.g. by contacting the screen using a finger or a stylus). When an object touches or comes within proximity of the surface of touch screen 24, a change in capacitance may occur within touch screen 24 at the location of the touch or proximity.

As shown in FIG. 2 and as discussed above, controller 12 may be included within touch sensor 10. In addition to the functionality discussed above, the controller 12 illustrated in FIG. 2 may be further configured to control the operation of switches 28 and component emulator 30. For example, controller 12 may use switches 28 to enable certain functionality of component emulator 30. In addition, controller 12 may use component emulator 30 in making a determination concerning the functionality of other components of touch sensor 10 (e.g. drive system 21 and sense system 22).

Each switch 28a, 28b, 28c, and 28d refers to one or more electrical components configured to selectively enable or disable the flow of current along conductive paths, such as paths 32 and 34. For example, certain switches 28 may selectively enable or disable the electrical coupling between one or more electrodes of drive system 21 and touch screen 24 along conductive path 34. As another example, particular switches 28 may selectively enable or disable the electrical coupling between one or more electrodes of drive system 21 and component emulator 30 along conductive path 32. In certain instances, switches 28 may be configured to selectively open or close an electrical connection between test system 20 and all or a portion of touch screen 24, which may be used, for example, to electrically isolate all or a portion of test system 20 from touch screen 24. Although FIG. 2 illustrates switches 28a, 28b, 28c, and 28d as having mechanical operation, in certain alternative embodiments switches 28 may have no moving parts. For example certain switches 28 may include one or more transistors or other electrical components that may provide an electrical switching function without mechanical movement.

Component emulator 30 refers to one or more electrical components configured to emulate certain functionality of touch sensor 10. For example, component emulator 30 may emulate certain functionality by providing a predetermined capacitance in series with the conductive path capacitively coupling an output of drive system 21 to an input of sense system 22 through component emulator 30. In certain instances, the predetermined capacitance may have a value substantially equal to an estimated capacitance that touch screen 24 should provide during normal operation. For example, the predetermined capacitance value may be within the range of approximately 1 to 3 pF; however, any suitable capacitance value may be used. In a particular embodiment, component emulator 30 is a capacitor having a capacitance of 2.5 pF.

In operation, test system 20 may be used to test certain functionality of touch sensor 10. For example, test system 20 may be used to test the interoperation of drive system 21 and sense system 22 by providing a predetermined capacitance in series with conductive path 32 capacitively coupling an electrode of drive system 21 to an electrode of sense system 22 through component emulator 30. Switches 28 may be used to electrically decouple touch screen 24 from test system 20, drive system 21, and sense system 22, as discussed above. When operating under such conditions, test system 20 may be considered as being enabled and touch sensor 10 may be considered as operating in a "test" mode. By comparing the test mode response of touch sensor 10 to an expected response, test system 20 may be capable of determining whether touch sensor 10 (or particular components thereof) is capable of functioning as intended (e.g. within one or more parameters of a specification).

The test result for a touch sensor 10 may be considered a "pass" if it is determined that touch sensor 10 (or particular components thereof) is fully functional. Conversely, the test result for a touch sensor 10 may be considered a "fail" if it is determined that touch sensor is incapable of certain functionality. In certain embodiments, the determination of the test result may be made, at least in part, using controller 12.

In various embodiments, test system 20 may enable the individual testing of multiple die on a substrate before those die have been singulated from the substrate (e.g. a semiconductor wafer). Additionally or alternatively, test system 20 may enable the testing of individual die after those die have been singulated from a substrate. For example, test system 20 may enable certain tests after die have been singulated, packaged, and wire bonded. Thus, certain embodiments may provide ways to test the functionality of devices at various processing steps, including at earlier stages in the manufacturing process. Identifying failing devices at earlier stages in the manufacturing process may, in certain instances, substantially reduce manufacturing costs. For example, if a particular die is deemed to have a failed a test before the die is singulated from a substrate, that die may not be picked from the substrate for further processing.

Figure 3:
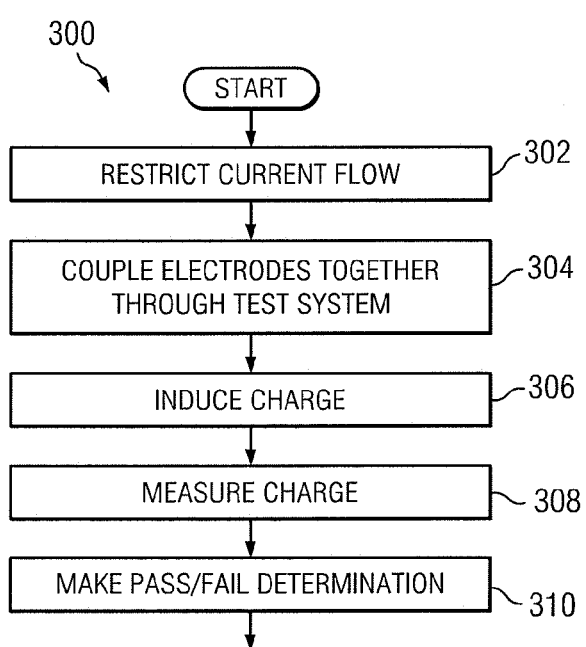
FIG. 3 illustrates an example flowchart that may be used by certain embodiments to test certain functionality of the example device of FIG. 1.

FIG. 3 illustrates an example flowchart 300 that may be used by certain embodiments to test certain functionality of the touch sensor 10 of FIG. 1. In operation 302, current flow may be restricted between nodes of touch sensor 10. As discussed above, for example, one or more switches 28 may be used to restrict current flow between touch screen 24 (or a node thereof) and one or more of drive system 21, sense system 22, controller 12, and component emulator 30.

In operation 304, drive system 21 may be capacitively coupled to the sense system 22 through test system 20. As discussed above, for example, controller 12 may configure switches 28c and 28d to allow the flow of current along conductive path 21, such that drive system 21 is electrically connected to component emulator 30.

In operation 306, drive system 21 and test system 20 are used to induce a predetermined charge on sense system 22. As discussed above, for example, an electrode of drive system 21 may be capacitively coupled to an electrode of sense system 22, such that a pulsed or alternating voltage applied to the drive electrode (by controller 12) may induce a charge on the sense electrode. Component emulator 30 may be configured to modify, when enabled, the amount of charge induced. For example, emulator component 30 may include a capacitor having a value that emulates the change in capacitance that would have been induced by a touch object touching touch screen 24.

In operation 308, the induced charge is measured. In a capacitive form of touch sensing, for example, sense system 22 may be in communication with controller 12 and may output a signal indicative of a sensed change in capacitance. In response, controller 12 may measure the change in capacitance, as discussed above.

In operation 310, a determination is made as to whether touch sensor (or a portion thereof) is functional. For example, controller 12 may determine whether the measured charge is within a predetermined range or greater than a predetermined threshold. In alternative embodiments, the determination may be made by a component other than controller 12. For example, touch sensor 10 may include an interface (e.g. a probe pad) that may be used to access data in the form of a voltage, which may then be used in making a "pass" or "fail" determination.

Although the preceding examples given here generally rely on self capacitance or mutual capacitance to operate, other embodiments of the invention will use other technologies, including other capacitance measures, resistance, or other such sense technologies.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   electrically decoupling a node of a touch sensor from each of a drive system of the touch sensor, a sense system of the touch sensor, and a test system of the touch sensor, while capacitively coupling the drive system to the sense system through the test system;
   using at least the drive system and the test system, inducing a charge on the sense; system, the test system emulating the node of the touch sensor;
   measuring the induced charge on the sense system; and
   making a pass or fail determination for at least a portion of the touch sensor based at least in part on the measured induced charge.

2. The method of claim 1, wherein the drive system comprises an array of drive electrodes, each drive electrode capacitively coupled to a respective sense electrode of an array of sense electrodes of the sense system, and each drive electrode configured to induce a charge to the respective sense electrode in response to a voltage applied to the drive electrode.

3. The method of claim 1, wherein restricting current flow comprises using at least one switch to create an electrical open in a conductive path between the drive system and the node of the touch sensor.

4. The method of claim 3, wherein the at least one switch comprises a transistor.

5. The method of claim 1, wherein the test system comprises a capacitor coupled in series in a conductive path capacitively coupling the drive system to the sense system through the test system.

6. The method of claim 1, wherein a touch screen of the touch sensor comprises the node of the touch sensor.

7. The method of claim 1, wherein the at least a portion of the touch sensor comprises one or more of the drive system and the sense system.

8. A touch sensor comprising:
a test system configured to emulate a node of the touch sensor;
a drive system comprising a plurality of drive electrodes, each drive electrode configured to transfer a charge in response to a voltage applied to the drive electrode;
a sense system capacitively coupled to the drive system through each of first and second conductive paths, the first conductive path comprising the test system, the second conductive path comprising the node, the sense system comprising a plurality of sense electrodes, each sense electrode configured to receive the charge transferred by a respective one of the plurality of drive electrodes; and
a switch system configured to selectively open and close each of the first and second conductive paths such that when the first conductive path is closed and the second conductive path is open the node of the touch sensor is electrically decoupled from the drive system and the sense system and the test system emulates the node of the touch sensor, and when the first conductive path is open and the second conductive path is closed the test system is electrically decoupled from each of the drive system, the sense system, and the node of the touch sensor.

9. The touch sensor of claim 8, wherein the test system comprises a capacitor coupled in series with respect to the first conductive path.

10. The touch sensor of claim 8, further comprising a controller configured to output an indication of whether the touch sensor has either passed or failed a test implemented using the test system.

11. The touch sensor of claim 8, wherein, by emulating the node of the touch sensor, the test system enables a test of a respective function of either the drive system or the sense system.

12. The touch sensor of claim 8, wherein, by emulating the node of the touch sensor, the test system enables a test of a respective function of each of the drive system and the sense system.

13. The touch sensor of claim 8, wherein the switch system comprises a transistor.

14. The touch sensor of claim 8, wherein:
the touch sensor is one of a plurality of die formed on a surface of a substrate; and
the test system is configured to emulate the node of the touch sensor before the touch sensor is singulated from the plurality of die formed on the surface of the substrate.

15. The touch sensor of claim 8, wherein a touch screen of the touch sensor comprises the node of the second conductive path.

16. A touch sensor comprising:
a sense electrode configured to sense a change in capacitance at a node of the touch sensor;
a drive electrode configured to induce a charge in the sense electrode in response to a voltage applied to the drive electrode;
a test system configured to emulate the node of the touch sensor;
a switch system configured to selectively enable and disable the test system, including opening and closing each of a first and a second conductive path such that when the first conductive path is closed and the second conductive path is open the node of the touch sensor is electrically decoupled from the drive electrode and the sense electrode and the test system emulates the node of the touch sensor, and when the first conductive path is open and the second conductive path is closed the test system is electrically decoupled from each of the drive electrode, the sense electrode, and the node of the touch sensor.

17. The touch sensor of claim 16, further comprising a controller configured to output an indication of whether the touch sensor has either passed or failed a test implemented using the test system.

18. The touch sensor of claim 16, further comprising an interface configured to output an indication of whether the touch sensor has either passed or failed a test implemented using the test system.

19. The touch sensor of claim 16, wherein the drive electrode is capacitively coupled to the sense electrode through a touch screen when the test system is disabled, but not when the test system is enabled.

\* \* \* \* \*